United States Patent [19]

Harris

[11] Patent Number: 5,070,792
[45] Date of Patent: Dec. 10, 1991

[54] MULTI-POSITION TRAVELLING CARRIAGE WITH FLEXIBLE TRACK

[75] Inventor: Michael F. Harris, Gormley, Canada

[73] Assignee: Gullco International Limited, Toronto, Canada

[21] Appl. No.: 505,994

[22] Filed: Apr. 9, 1990

[51] Int. Cl.⁵ .................................................. B23K 37/02
[52] U.S. Cl. .................................... 105/29.1; 104/119; 173/32
[58] Field of Search ............... 104/165, 119; 105/29.1, 105/29.2, 127; 173/31, 32, 33, 34, 37

[56] References Cited

U.S. PATENT DOCUMENTS

| Re. 28,121 | 8/1974 | Gulley | 105/29.1 |
| 3,459,134 | 8/1969 | Shepheard | 105/29.1 |
| 3,575,364 | 4/1971 | Frederick | 173/32 |
| 3,589,205 | 6/1971 | Radovic | 105/29.1 |
| 3,756,670 | 9/1973 | Harris | 105/29.1 |
| 4,158,315 | 6/1979 | Kensrue et al. | 173/32 |
| 4,353,308 | 10/1982 | Brown | 105/29.1 |
| 4,422,384 | 12/1983 | Johnson et al. | 173/32 |
| 4,570,542 | 2/1986 | Cable et al. | 105/29.1 |
| 4,703,698 | 11/1987 | Kazlauskas | 105/29.1 |

FOREIGN PATENT DOCUMENTS 904735 7/1972 Canada .
972399 7/1975 Canada .

Primary Examiner—Robert J. Oberleitner
Assistant Examiner—Mark T. Le
Attorney, Agent, or Firm—Ridout & Maybee

[57] ABSTRACT

The invention relates to the use of a thin flexible track of spring steel having a series of perforations therethrough for use in conjunction with a variable speed travel carriage having a carriage drive sprocket which is studded about the periphery with balls or spherical members adapted to mesh with the track perforations to drive the carriage along. By this arrangement, greater loads may be driven than was hitherto possible with known flexible-track devices requiring the use of a guide and drive track following the contour of workpiece upon which work is being carried out.

5 Claims, 4 Drawing Sheets

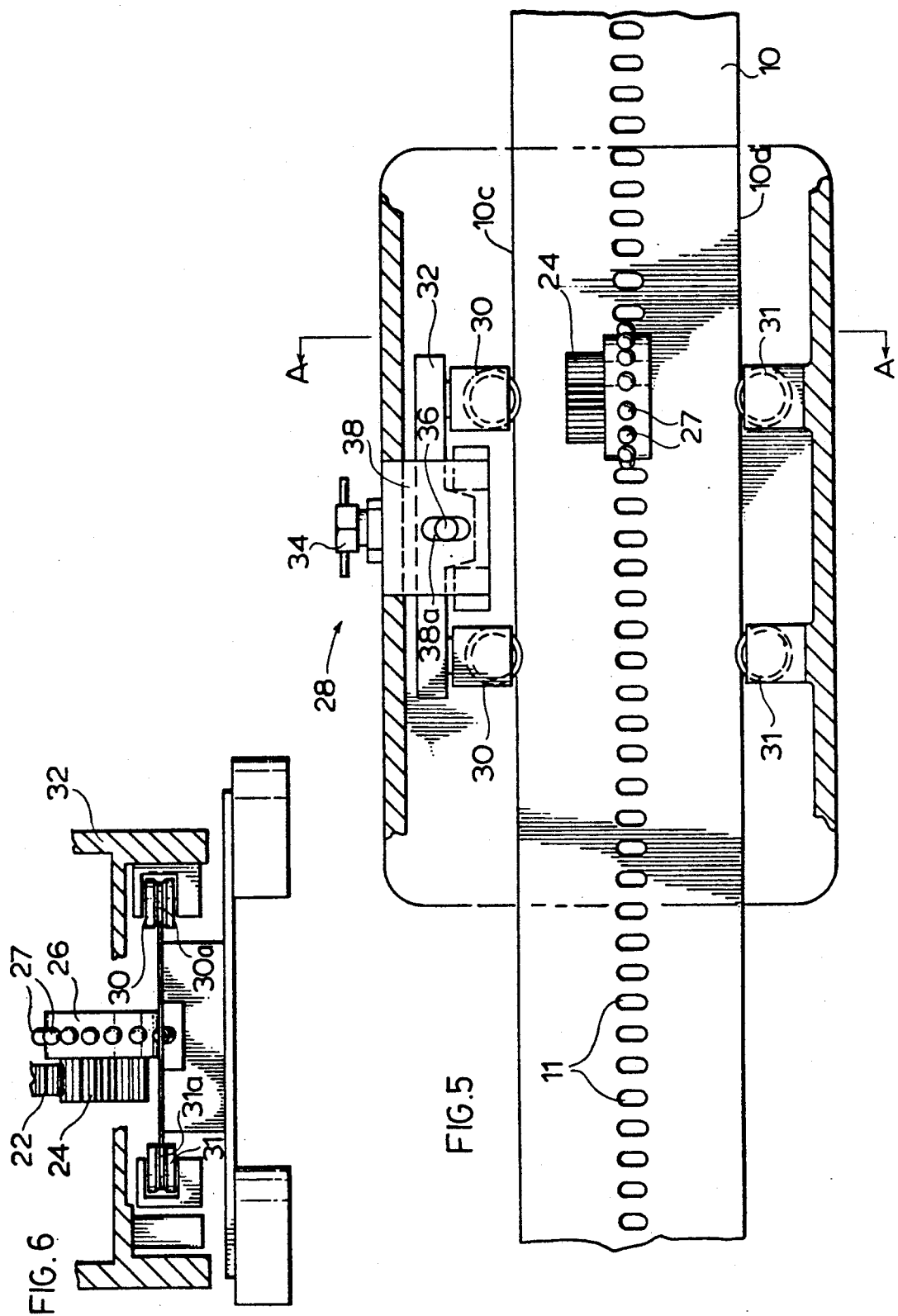

MULTI-POSITION TRAVELLING CARRIAGE WITH FLEXIBLE TRACK

FIELD OF THE INVENTION

This invention relates to improvements in track systems for all-position variable speed travel carriages, particularly of the kind employed for automated welding and cutting operations. The principal improvement comprises the use of a thin flexible track of spring steel having a series of apertures therethrough defining the travel pathway of the carriage, in conjunction with a carriage drive sprocket having firmly affixed to the outer periphery thereof a line of angularly equidistant spherical members, such as steel ball bearings, which mesh with the track apertures to drive the carriage therealong. Such a carriage drive sprocket is referred to hereinafter as a "ball-studded drive sprocket".

DESCRIPTION OF THE PRIOR ART

The present invention may advantageously be employed with slightly modified versions of the automated tool carriages described in U.S. Pat. No. Re. 28,121 to J. M. Gulley dated Aug. 20, 1974 and U.S. Pat. No. 3,756,670 to M. F. Harris dated Sept. 4, 1973, both of which were assigned to predecessors in title of the assignee of the present invention. Both of the aforesaid patents relate to wheelable tool holding carriages which are motor-driven, gear-connected and track-confined vehicles. The disclosures of the said two patents are incorporated herein by reference for their teachings as to positive rack and pinion drive mechanisms and carriage-to-track clamping means manually operable to clamp or release transversely variable spaceable roller means to the track.

By adapting the arrangements disclosed in U.S. Pat. Nos. Re. 28,121 and 3,756,670 to a track which is flexible at right angles to its length, a single piece of track may be used on a variety of working surface contours with attendant advantages of convenience and economy.

The use of flexible track for supporting a carriage-driven welding apparatus or the like is disclosed in U.S. Pat. No. 3,575,364 (Frederick) and U.S. Pat. No. 4,570,542 (Gable et al.), but neither of these suggests the use of a flexible track and drive system for carrying a working apparatus, in which the track has apertures therethrough adapted to receive spherical "teeth" on the drive sprocket.

Known flexible track or ribbon rail systems, using rack-form tracks interacting with conventional toothed sprocket drives are occasionally undependable owing to the tendency of a conventional toothed wheel to disengage from the rack, particularly when loads are being driven vertically therealong.

SUMMARY OF THE INVENTION

The present invention is intended to overcome, by a simple and inexpensive form of track and sprocket arrangement, the undependability of rack-form track and conventionally toothed sprocket drives in vertically driving loads of greater than about 25 pounds or so.

An object of the present invention is to provide a novel form of apertured flexible track for guiding and supporting a movable tooling carriage on a workpiece in which a carriage drive sprocket directly engages the track by spherical teeth, providing a strong positive drive relationship.

A further object of the present invention is to provide a flexible track as aforesaid which may readily be manufactured in any desired length from spring steel or the like, which provides resistance to torsional deformation while still affording sufficient flexibility to permit the track to conform to the shape of the workpiece to which it is attached.

A further object of the present invention is to provide in combination a carriage for carrying a working apparatus, having a ball-studded drive sprocket drivingly engaging a regular series of apertures through a flexible track, and a clamping assembly on the carriage for substantially reducing torsional stresses on the track arising from the weight of the loaded carriage travelling therealong.

BRIEF DESCRIPTION OF THE DRAWINGS

Other objects, features and advantages of the present invention will be apparent to those skilled in the art from a consideration of the following description and the accompanying drawings, in which like reference numerals designate similar parts in the several views:

FIG. 5 is a partial underside plan view of the carriage and track of FIG. 1, showing engagement of the ball-studded drive sprocket with the track, and additionally illustrating a roller clamping assembly for further rigidifying the track against torsional distortion according to a preferred embodiment of the invention; and FIG. 6 is a sectional view of the arrangement of FIG. 5 seen along the direction A—A.

DESCRIPTION OF THE PREFERRED EMBODIMENT

Figure 1:
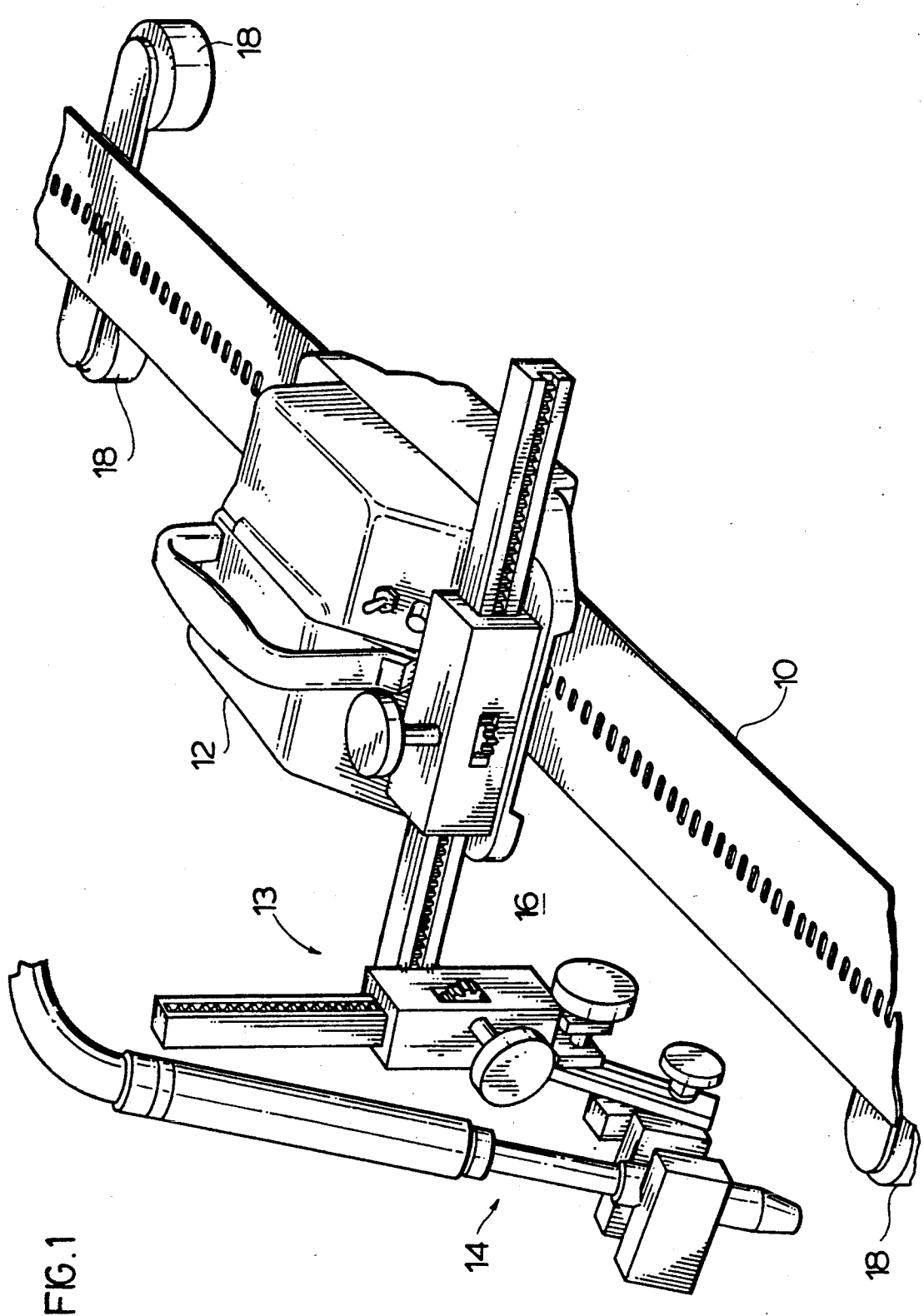
FIG. 1 is a perspective representation of a tool-holding carriage installed to run along a track according to the invention, affixed to a planar workpiece surface.
Figure 4:
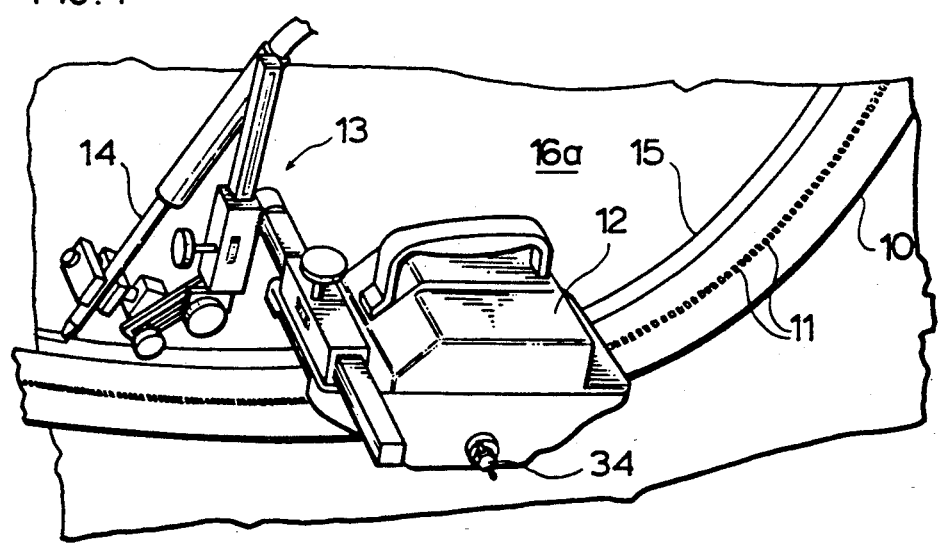
FIG. 4 is a perspective representation of a tool-holding carriage and track as in FIG. 1, but with the track affixed to a substantially concavely curved portion of the surface of a workpiece.

Referring to FIGS. 1 and 4, a track 10 in accordance with the invention is illustrated in conjunction with a vehicle 12 carrying laterally and vertically adjustable welding or cutting means 14. The particular rack and gear adjustment means permitting preset positioning of the welding or cutting tool 14 relative to the vehicle 12, indicated generally at 13, is conventional and is described in detail in the aforesaid U.S. Pat. No. Re. 28,121, and is not an essential element of the present invention.

In the view of the carriage drive mechanism illustrated in FIG. 1, track 10 having a central line of apertures 11 is shown secured to and spaced above the workpiece surface 16 by magnetic or vacuum-actuated mounting devices 18 known to the prior art, e.g. U.S. Pat. No. Re.28,121.

Figure 2:
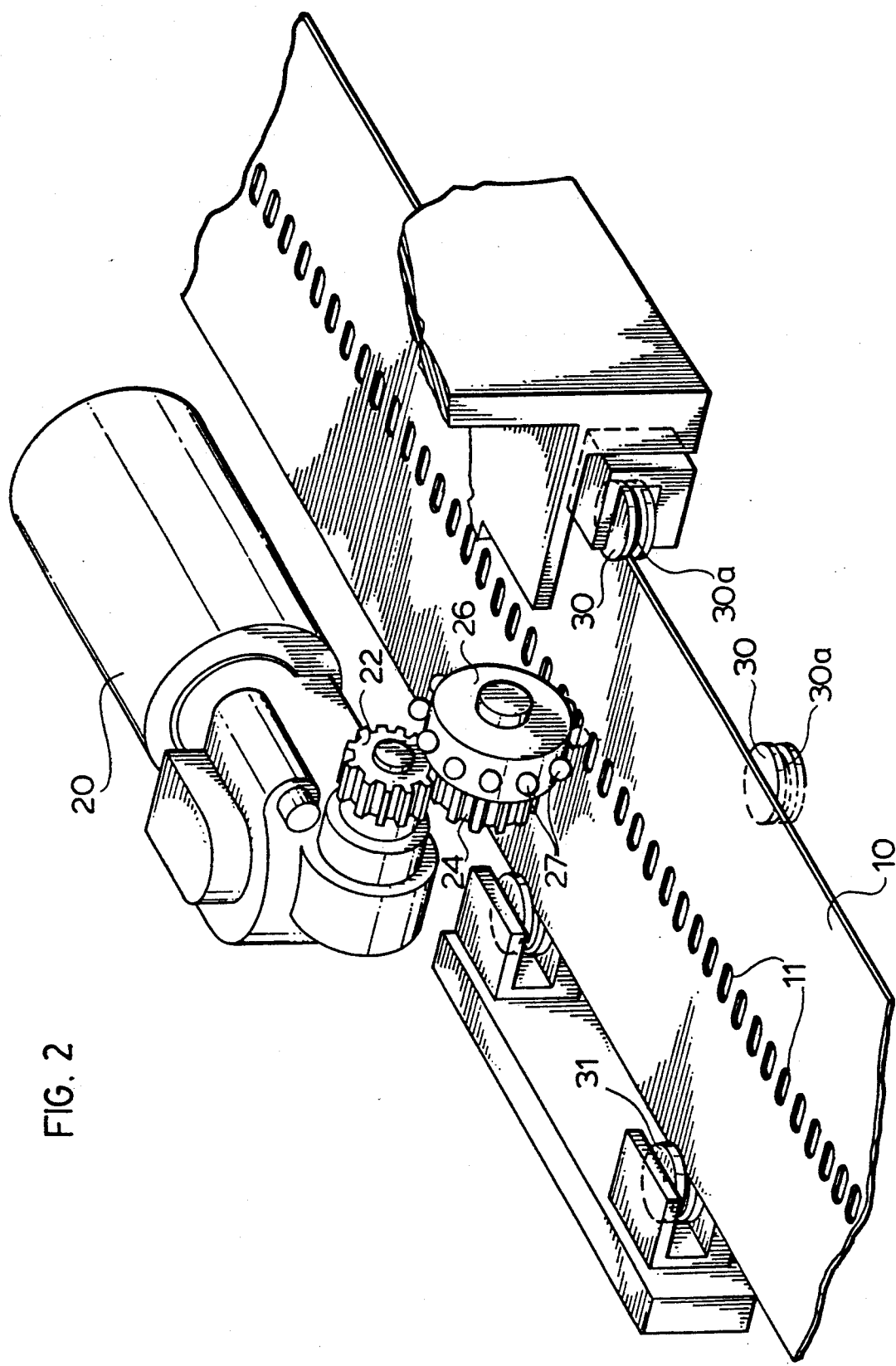
FIG. 2 is a perspective representation of the interior driving elements of a tool-holding carriage showing the ball-studded drive sprocket in meshing engagement with the apertures of the track according to the invention.

As best seen in FIGS. 2, 5 and 6 the housing of the carriage 12 includes a source of power in the form of an electric motor (not shown) whose armature is operatively associated with gear reduction means collectively designated 20. The track drive comprises an upper gear 22 driven through the powered gear reduction means 20. Upper gear 22 meshes with a lower gear 24 which is integrally formed with or rigidly secured to a coaxial ball-studded sprocket 26 having a regularly spaced peripheral line of spherical "teeth" 27 which mesh with apertures 11 when the carriage is installed on track 10.

Track 10 according to the invention is preferably a strip of spring steel, which has a central line of regularly spaced holes or apertures 11 for receiving the spherical teeth 27 of the drive sprocket 26. The center line of apertures 11 must be in the vertical plane bisecting the peripheral array of spherical teeth 27, but the apertures need not themselves be circular. In the drawing figures, apertures of a generally transverse oval shape are illustrated, that form of aperture being more readily formed by tool-punching through the ribbon of track 10.

Where track 10 is made of spring steel, the thickness should be such as to afford torsional strength without undue sacrifice of flexibility. It has been found that these objectives are met by the use of an apertured spring steel track having a uniform thickness in the range of between about 18 gauge (0.048") and about 10 gauge (0.128"), most preferably about 16 gauge (0.064"). Preliminary testing has shown that conventionally-shaped drive sprocket teeth are not useable for the engagement of apertures in track this thin, tending to "walk out" of the apertures, rather than providing the necessary positive drive engagement.

The spherical teeth 27 associated with sprocket 26 may be steel ball bearings firmly seated in position by a process of vacuum brazing, the use of threaded pins, press-fitting or any other technique for accurate and secure installation of a central ring of spherical members along the periphery of and coaxial with the cylindrical sprocket 26.

For proper engagement of the spherical teeth 27 with the apertures 11, the corresponding longitudinal dimension of the apertures must be neither too small, which would prevent ready engagement of the spherical teeth with the apertures, nor too great. It has been found that a total clearance of between about 8 one-thousandths and 40 one-thousandths of the ball diameter allows for smooth operation and maximum load-bearing capacity of the sprocket-to-track engagement. Thus, for a drive sprocket peripherally studded with ball bearings 27 having a diameter of one quarter inch, apertures 11 should be formed to afford clearance in the range of between about 0.002" and about 0.010".

The diameter of the spherical teeth 27 should be very slightly less than the corresponding longitudinal spacing of the apertures 11. A clearance of the order of 1/1000 of the ball diameter is acceptable for smooth operation and maximum load bearing capacity of the sprocket-to-track engagement.

Figure 3:
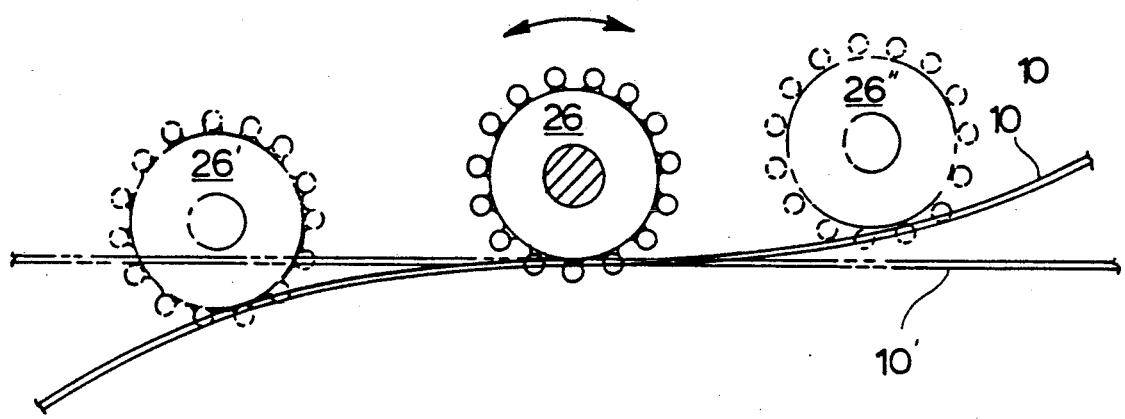
FIG. 3 is a schematic representation of the engagement of the ball-studded sprocket of a tool-holding carriage at several positions along a generally serpentine path of travel of the carriage along a track according to the invention.

In FIG. 3 there is illustrated in side view the engagement of the balls of a driven sprocket 26 rotating in either sense of the double arrows to successive positions 26' or 26" along an apertured track 10 bent for use on a serpentine (concave-convex) contoured portion of a work surface, with a phantom horizontal track 10' included for comparison.

FIG. 4 illustrates the use of the invention in adapting a carriage-mounted tool 14 to weld or cut along a selected line 15 on a substantially concavely curved portion of a work surface 16a.

Unlike the interaction between teeth of triangular or trapezoidal profile and a rack-form track, each spherical member 27 of the drive sprocket 26 tends by the nature of its curvature to "pull itself in" to an aperture 11 as it rides over it, even when the track is vertically disposed. As noted above conventional teeth cannot successfully be used with an apertured ribbon-form flexible track of the kind which is an aspect of the present invention.

In a preferred arrangement illustrated in FIGS. 2, 5 and 6, carriage 12 includes a roller clamping assembly, illustrated generally as 28 in FIG. 5, and transversely variably spaced wheel or roller means comprising aligned and opposed pairs of idle rollers 30 and 31 which include peripheral grooves 30a and 31a, respectively, for rollably and lockably engaging with the lateral edges of ribbon-form track 10.

Clamping assembly 28 includes a transversely adjustable frame 32 carrying idle rollers 30, which by manual adjustment of lateral screw advancing means 34 may be moved towards or away from one edge 10c of track 10, within a range of adjustment limited by stopping means such as that illustrated in FIG. 5, comprising a vertical post 36 fixed to carriage 12 and a plate 38 affixed to movable frame 32, having therethrough a limiting aperture 38a through which post 36 passes. Motion of frame 32 is stopped by the abutment of post 36 against the edge of aperture 38a at the abutment of post 36 against the edge of aperture 38a at the two extremes of permitted transverse adjustment.

When carriage 12 is installed on track 10 for motion therealong, screw advancing means 34 is set so that edge 10c of track 10 fits closely within the peripheral grooves of the rollers 31 and the opposite edge 10d of track 10 fits closely within the peripheral grooves of opposed like rollers 31, as best seen in FIGS. 5 and 6.

The above-described arrangement of a preferred roller clamping assembly for use in combination with a vehicle or carriage 12 and track means 10 is a modification of means disclosed in the prior art (Gulley and Harris patents referred to above) for releasably locking a carriage to a length of track via rollers on the carriage while continuing to permit the carriage to travel via said rollers upon said track, by being adapted for use in conjunction with a thin flexible track according to the invention. Various possible modifications will be apparent to persons skilled in the art, as will other embodiments of the flexible apertured track and ball-studded drive sprocket within the scope of the following claims:

I claim:

1. An elongate flexible strip-form track for carrying a powered travelling carriage, said track presenting a regular series of apertures therethrough parallel to and centrally positioned between the sides thereof, said series of apertures defining a travel pathway for said carriage, said track being provided with means for releasably securing said track to the surface of a workpiece of a given contour with the underside of said track at a selected displacement from said surface, and said carriage having a ball-studded gear drivingly meshing with the apertures of said track for driving the carriage along said travel path, said apertures being so dimensioned to provide a clearance of between about 8 one-thousandths and about 40 one-thousandths of the diameter of the balls on said driving gear of the carriage.

2. An elongate flexible strip-form track as defined in claim 1, fabricated of thin spring steel.

3. An elongate flexible track as defined in claim 2, wherein the thickness of said spring steel is between about 18 gauge and about 10 gauge.

4. An elongate flexible strip-form track as defined in claim 1, wherein said carriage includes clamping means manually operable to clamp or release transversely variable spaceable roller means to opposite edges of said track.

5. An elongate flexible strip-form track as defined in any one of claims 1, 2, 3, and 4, wherein said means for releasably securing said track to the surface of a workpiece comprises at least one set of a set of magnets and a set of vacuum cups disposed along either side of the track.

* * * * *

UNITED STATES PATENT AND TRADEMARK OFFICE
CERTIFICATE OF CORRECTION

PATENT NO.    : 5,070,792
DATED         : December 10, 1991
INVENTOR(S)   : Michael F. Harris It is certified that error appears in the above-identified patent and that said Letters Patent is hereby corrected as shown below:

Title page, item [73], Assignee: should read

-- Gullco Enterprises Limited --

Signed and Sealed this

Thirtieth Day of March, 1993

*Attest:*

STEPHEN G. KUNIN

*Attesting Officer*   Acting Commissioner of Patents and Trademarks